United States Patent
Terai

(10) Patent No.: US 9,264,831 B2
(45) Date of Patent: Feb. 16, 2016

(54) MULTITRACK RECORDER

(71) Applicant: TEAC Corporation, Tama-shi, Tokyo (JP)

(72) Inventor: Shota Terai, Kawasaki (JP)

(73) Assignee: TEAC Corporation, Tokyo (JP)

( * ) Notice: Subject to any disclaimer, the term of this patent is extended or adjusted under 35 U.S.C. 154(b) by 417 days.

(21) Appl. No.: 13/749,522

(22) Filed: Jan. 24, 2013

(65) Prior Publication Data

US 2014/0056434 A1 Feb. 27, 2014

(30) Foreign Application Priority Data

Aug. 23, 2012 (JP) ................. 2012-184376

(51) Int. Cl.
*H04R 29/00* (2006.01)
*G11B 27/034* (2006.01)
*G11B 27/34* (2006.01)
*H03G 3/20* (2006.01)

(52) U.S. Cl.
CPC ............ *H04R 29/008* (2013.01); *G11B 27/034* (2013.01); *G11B 27/34* (2013.01)

(58) Field of Classification Search
CPC .... H04R 29/008; H04R 29/00; G11B 27/034; G11B 27/34
USPC ............... 381/58, 56, 12, 119, 118, 104, 109; 700/94; 345/204
See application file for complete search history.

(56) References Cited

U.S. PATENT DOCUMENTS

2010/0309153 A1 12/2010 Terada

FOREIGN PATENT DOCUMENTS

JP 2010232950 A 10/2010

OTHER PUBLICATIONS

"R24 USer Manual", Nov. 2011, Zoom Corporation.*
"DP-24 Owner's MAnual", Apr. 30, 2012, Tascam Corporation.*
R24 USer Manual, Nov. 2011, Zoom Corporation.*
DP-24 Owner's MAnual, Apr. 30, 2012, Tascam Corporation.*
Communication pursuant to Article 94(3) EPC, dated Apr. 13, 2015, for corresponding EP Application No. 13 175 445.9-1910, 4 pages.
Extended European Search Report dated May 26, 2014, for corresponding EP Application No. 13175445.9-1910, 5 pages.
TEAC Corporation, "Tascam TEAC Professional 2488neo: Digital Portastudio, Owner's Manual," XP-002711381, Sep. 3, 2008, pp. 1-124.
TEAC Corporation, "Tascam DP-24; Digital Portastudio, Owner's Manual," XP-002711403, Apr. 20, 2012, pp. 1-108.
Zoom Corporation, "R24 Recorder:Interface:Controller:Sampler, Operation Manual," XP-002711380, Nov. 2011, pp. 1-137.

* cited by examiner

*Primary Examiner* — Vivian Chin
*Assistant Examiner* — Ammar Hamid
(74) *Attorney, Agent, or Firm* — Seed IP Law Group PLLC

(57) ABSTRACT

A multitrack recorder enables performance of easy identification as to whether a certain track is a monaural type or a stereo type, by means of level meters. The multitrack recorder can set tracks 3 and 4, among a plurality of tracks 1 through 4, to either a monaural type or a stereo type. When track types are stored in memory and when level meters are displayed in a display section, a width of each of track number displays and the number of level displays are changed between the monaural type and the stereo type.

6 Claims, 4 Drawing Sheets

MULTITRACK RECORDER

PRIORITY INFORMATION

This application claims priority to Japanese Patent Application No. 2012-184376, filed on Aug. 23, 2012, which is incorporated herein by reference in its entirety.

TECHNICAL FIELD

The invention relates to a multitrack recorder that records a sound signal in a plurality of tracks.

BACKGROUND ART

A hitherto-known multitrack recorder records a sound signal into a plurality of tracks. A multitrack recorder makes it possible to record a rhythm guitar part in a track 1 and a lead guitar part in a track 2 by use of; for instance, an electric guitar and a vocal sound in a track 3 by use of a built-in microphone and mix down them to thereby generate and record a stereo signal.

It is desirable that the multitrack recorder be able to record a sound signal in as many tracks as possible. In the meantime, when an attempt is made to make the multitrack recorder compact in consideration of portability, limiting the number of tracks might be unavoidable. Measures that are conceivable in the circumstances are to limit the number of tracks to a certain number; for instance, four and make some of the tracks assignable to either a monaural type or a stereo type rather than fixing the tracks solely to monaural types to enhance user's convenience.

JP 2010-232950 A discloses an audio mixing device that displays signal levels of a plurality of channels as a level meter image and that also enables simultaneous observation of other pieces of information about the respective channels. When a signal type of an individual channel exhibits a correlation with a signal of an adjacent channel, the channel is displayed in a shape of a common link with the adjacent channel.

In a configuration where the number of tracks is limited to a constant number and where some of the tracks can be set to either a monaural type or a stereo type, it is necessary to accurately take hold of types of respective tracks during processing, such as a case where a sound signal recorded in a certain track is replicated (copied) to anther track. However, the configuration where the user memorizes which tracks are of a monaural type and which tracks are of a stereo type casts an additional burden on the user. In the meantime, it will also be troublesome for the user to check, each time, which tracks are of a monaural type and which tracks are of a stereo type on a dedicated screen, or the like. The user usually visually identifies a level meter in order to ascertain a level of a sound signal of each track. Hence, it is convenient for the user to be able to grasp a track type of each track at a glance on a display screen of the level meter.

SUMMARY

The invention aims at easy visual identification of a track type on a display screen with level meters, in a multitrack recorder that can set at least some of a plurality of tracks to a monaural type or a stereo type.

The invention is directed toward a multitrack recorder that records a sound signal into a plurality of tracks and that is characterized by comprising: setting means capable of setting at least any of the plurality of tracks to either a monaural track type or a stereo track type; storage means that stores the track types set by the setting means; display means that displays symbols for specifying the plurality of respective tracks and sound signal levels of the respective tracks; and control means that changes a display style of each of the symbols and the sound signal levels displayed on the display means between the monaural track and the stereo track according to each of the track types stored in the storage means.

In one embodiment of the invention, the control means is characterized by displaying two bars of sound signal level for the stereo-type track and a symbol common to the two bars of sound signal level as the symbol.

Moreover, in another embodiment of the invention, the control means is characterized by setting a width of the symbol to dm and showing one bar of sound signal level in relation to the monaural-type track, and setting a width of the symbol to ds (where dm<ds) and showing two bars of sound signal level in relation to the stereo-type track.

Furthermore, in yet another embodiment of the invention, the control means changes a display color of, at least, the symbol or the sound signal level between the stereo-type track and the monaural-type track.

According to the invention, when at least any of the plurality of tracks is set to a monaural type or a stereo type, the user can easily visually identify a track type of the track by visually checking a display screen of the level meter. Consequently, the user can save the trouble of storing set track types or switching a screen to a dedicated screen for displaying track types. Moreover, when the track type is a monaural type, one bar of sound signal level is displayed. When the track type is a stereo type, two bars of sound signal levels are displayed. Thereby, the user can intuitively ascertain track types.

The invention will be more clearly comprehended by reference to the embodiment provided below. However, the scope of the invention is not limited to the embodiment.

BRIEF DESCRIPTION OF THE DRAWINGS

A preferred embodiment of the present invention will be described in detail by reference to the following drawings, wherein.

DETAILED DESCRIPTION

An embodiment of the invention is hereunder described by reference to the drawings.

Figure 1:
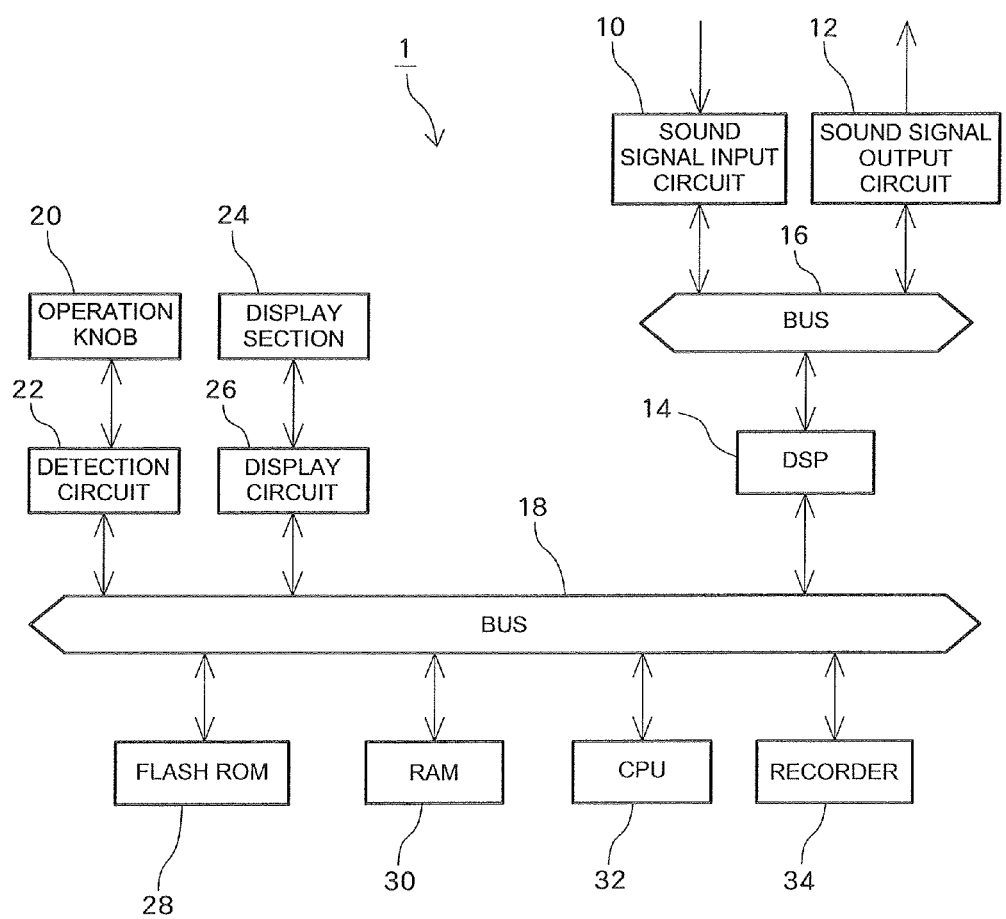
FIG. 1 is a block diagram of a multitrack recorder of an embodiment.

FIG. 1 is a block diagram of a multitrack recorder 1 of the embodiment. A sound signal input circuit 10 has a plurality of input ports and is provided with inputs of sound signals from a plurality of sound generators (sources). Exemplifications of the plurality of sound signals include a guitar sound, a vocal sound, a drum sound, and the like. In the embodiment, the sound signal input circuit 10 has two built-in microphones and two input ports and is provided with inputs of sound signals. The built-in microphones and the input ports are switchable. A sound signal input by way of the sound signal input circuit 10 is fed to a DSP (Digital Signal Processor) 14 by way of a bus 16.

Under control of a CPU 32, the DSP 14 subjects sound signals of a plurality of channels, which are fed from the sound signal input circuit 10, to various digital processing; for instance, effect processing, equalizing, or mixing, and are recorded in the recorder 34 by way of the bus 18. A recording medium of the recorder 34 is an optical disc, including a CD-R/RW and a DVD-R/RW, a hard disc drive, a flash memory medium, and the like. Processing of the DSP 14 also includes processing for controlling PAN and a volume level of each of the sound signals according to manipulation of operation knobs 20.

The operation knobs 20 are disposed on an operation surface of the multitrack recorder 1. The operation knobs 20 are made up of various key switches, a selection button, a menu button, a determination button, a PAN knob, a level knob, and others. The user assigns an individual sound signal to at least one track of a plurality of tracks by manipulating the operation knobs 20. A detection circuit 22 detects a state of manipulation of the operation knobs 20. The detection circuit 22 supplies a manipulation status detection signal pertaining to the operation knobs 20 to the CPU 32 by way of the bus 18.

The CPU 32 collectively controls an entirety of the multitrack recorder. According to a program stored in flash ROM 28, the CPU 32 performs various processing by use of RAM 30 serving as working memory. Specifically, respective sound signals of a plurality of channels are assigned to at least any of the plurality of tracks according to the operation status detection signal from the detection circuit 22. For instance, when there are tracks from a track 1 to a track 4, a channel A is assigned to the track 1; a channel B is assigned to the track 2; and a channel C is assigned to the track 4. In the embodiment, a correlation between channels and tracks resulting from assignment of the respective channels to the respective tracks is referred to as "assignment information." The CPU 32 supplies various information to a display circuit 26. The display circuit 26 displays various information on a display section 24.

The CPU 32 commands the display circuit 26 to display a variety of menu screens and a setting screen in compliance with user's manipulation of the operation knobs 20. According to information from the CPU 32, the display circuit 26 displays the menu screen and the setting screen on the display section 24. The menu screens include one for assigning each of the tracks 1 through 4 to either a monaural type or a stereo type. In the embodiment, at least any of the tracks 1 through 4 is configured so as to be selectable between a monaural type and a stereo type. The user sets a desired track to either a monaural type or a stereo type. In the multitrack recorder of the embodiment, the track 1 and the track 2 are set to monaural types, and the track 3 and the track 4 can be set to either a monaural type or a stereo type. The setting screen includes one for replicating (cloning or copying) the sound signal recorded in a certain track to another track. The user manipulates the operation knobs 20 on the setting screen, thereby selecting a source track and a destination track.

The CPU 32 commands the display circuit 26 to display a level of the sound signal assigned to each of the tracks in the form of a bar chart (a level meter), and the display circuit 26 displays a level meter image on the display section 24 in accordance with information from the CPU 32.

Moreover, the CPU 32 reads a sound signal recorded in the recorder 34 in conformance with the operation status detection signal from the detection circuit 22 and feeds the signal to the DSP 14. The DSP 14 outputs a sound signal to the outside by way of the bus and the sound signal output circuit 12. The sound output circuit 12 has various output ports, such as an analogue output port and a digital output port.

Figure 2:
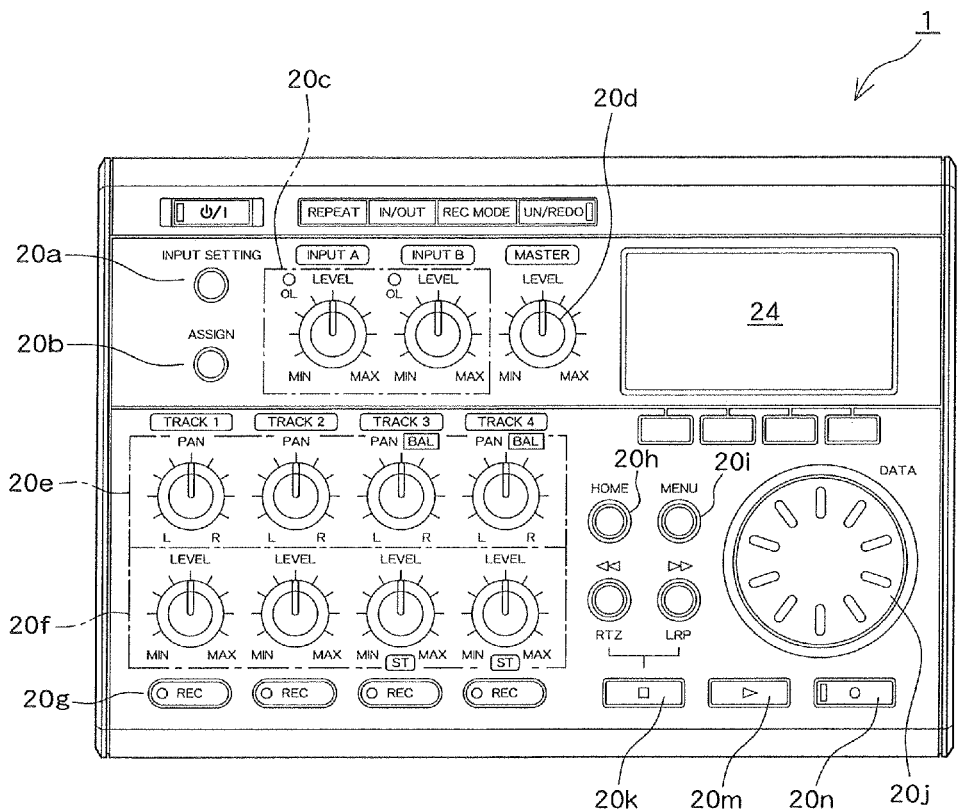
FIG. 2 is a plan view of the multitrack recorder of the embodiment.
Figure 3:
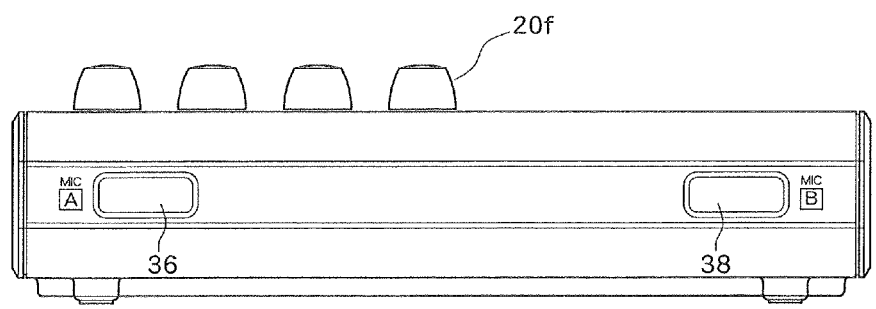
FIG. 3 is a front view of the multitrack recorder of the embodiment.
Figure 4:
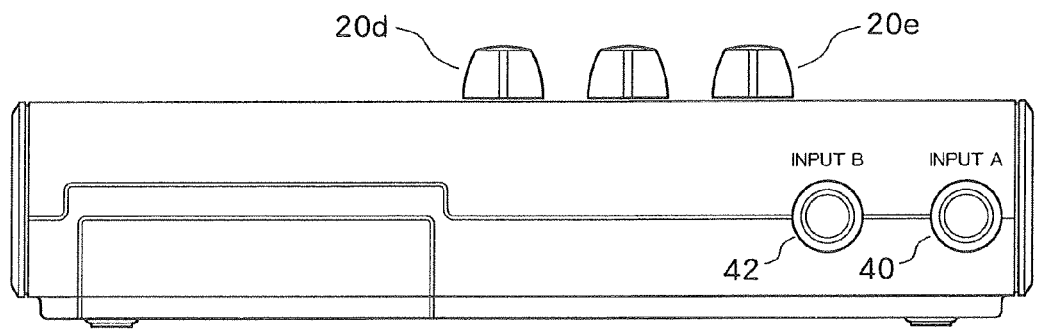
FIG. 4 is a rear view of the multitrack recorder of the embodiment.

FIG. 2 shows a plan view of the multitrack recorder 1 of the embodiment. FIGS. 3 and 4 show a front view and a rear view of the multitrack recorder, respectively.

The operation surface of the multitrack recorder 1 is provided with the variety of operation knobs 20 and the display section 24. The operation knobs 20 include an input setting key 20a, an assign key 20b, an input channel level knob 20c, a master level knob 20d, a PAN knob 20e, a level knob 20f, a recording function key 20g, a home key 20h, a menu key 20i, a data wheel 20j, a stop key 20k, a playback key 20m, and a record key 20n.

The input setting key 20a is one for selecting an input source. The user performs switching whether to use a built-in microphone or an input port as an input source, by manipulating the key.

The assign key 20b is one for assigning an input sound signal to each of the tracks 1 through 4. The user manipulates the key, to thus assign and record a sound signal to each track.

The input channel level knob 20c is one for controlling a level of each of the input sources. The user controls a level of each of the input sources by manipulating the knob. For instance, when the input source is set to a built-in microphone, a level of a sound signal input from the built-in microphone is controlled by use of the knob.

The master level knob 20d is one for controlling a monitor level of a stereo output signal.

The PAN knob 20e is one provided for each of the track 1 to the track 4 and controlling a normal position (PAN) for stereo mix of the sound signal of each of the tracks.

The level knob 20f is provided for each of the track 1 to the track 4 and controlling a level of a sound signal of each of the tracks.

The recording function key 20g is provided for each of the track 1 to the track 4. A track of interest shifts to a record standby state by user's manipulation of the recording function key 20g. When the playback key 20m and the record key 20n are manipulated in the record standby state, a sound signal is recorded in the track that is in the record standby state.

The home key 20h is one for displaying a home screen on the display section 24. The home screen is a basic screen of the multitrack recorder 1 and appears immediately after power of the multitrack recorder 1 is turned on. When the home key 20h is manipulated in the middle of appearance of another screen, the home screen is displayed on the display section 24. The home screen displays a recorder motor and its power status, a transport status of the recorder, a time counter of the recorder, a status and a level meter of each of the tracks 1 to 4, stereo output level meters, and others.

The menu key 20i is one for displaying a menu screen on the display section 24. The menu screen includes information, track edition, a data backup, a tuner, and others. The track edition includes a clone track, cleanout, silence, a cut, open, and others. The clone track is a menu for replicating a track, and cleanout is a menu for deleting a track. Silence is a menu for partially deleting a track. Cut is a menu for partially deleting a track. Open is a menu for inserting silence.

The data wheel 20j is one for changing a value of each of the parameters or selecting an item by means of menu manipulation.

In the meantime, as shown in the front view of FIG. 3, built-in microphones 36 and 38 are disposed on both sides of the front of the multitrack recorder 1. The built-in microphones 36 and 38 are usually used as right and left microphones; namely, the built-in microphone 36 for an L channel and the built-in microphone 38 for an R channel, during stereo recording operation. However, use of the built-in microphones 36 and 38 is not limited to the way mentioned above. Only either the built-in microphone 36 or the built-in microphone 38 can be used. Alternatively, the built-in microphone 36 can be used for an R channel, and the built-in microphone 38 can be used for an L channel. Levels of the sound signals input from the built-in microphones 36 and 38 are controlled by means of the input channel level knob 20c.

Moreover, as shown in a rear view of FIG. 4, input ports 40 and 42 are provided on a rear surface of the multitrack recorder 1. Levels of sound signals input by way of the input ports 40 and 42 are likewise controlled with the input channel level knob 20c.

The user can select a desired channel and a desired track by use of the operation knobs 20 and assign a sound signal to a desired track. For instance, the input port 40 is selected as a channel A, and a guitar sound signal is input. The input port 42 is selected as a channel B, and a drum sound signal is input. Assignment is set as follows by use of the assign key 20b.

Channel A (a guitar sound signal)—Track 1
Channel B (a drum)—Track 2

Assignment information is stored in the RAM 30. The user sets a track 3 and a track 4 by switching them to a monaural type or a stereo type, by use of the operation knobs 20. For instance, the followings are set:

Track 3—stereo
Track 4—monaural

Specifically, each of the track 3 and the track 4 is made up of two channels. When the track is set to a monaural type, only one of the two channels is enabled. In contrast, when the track is set to a stereo type, both of the two channels are enabled and set as an L channel and an R channel. Accordingly, when the track 3 is set to a stereo type, an L channel sound signal and an R channel sound signal are recorded in the track 3.

Setting each of the tracks 3 and 4 to either a monaural type or a stereo type and the level meter screen in the embodiment are now described specifically.

Figure 5:
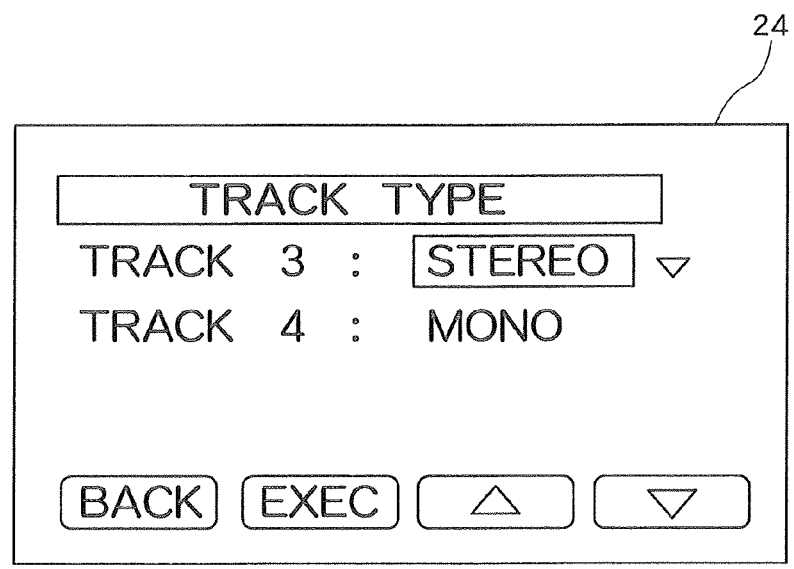
FIG. 5 is a descriptive view showing a setting screen of a track type.

FIG. 5 shows an exemplification of a screen that appears on the display section 24 when the user selects a track type by manipulating the menu key 20i and the data wheel 20j. In response to manipulation of the menu key 20i and the data wheel 20j, the CPU 32 displays on the display section 24 a setting screen as to whether to set the track 3 and the track 4 to a monaural type or a stereo type. Alternatives, or monaural and stereo types, for each of the tracks 3 and 4 are displayed on the screen. The user manipulates the data wheel 20j, to thus make a choice. FIG. 5 shows a case where the user sets the track 3 to a stereo type and the track 4 to a monaural type. Type information about the track 3 and the track 4 is stored in the RAM 30. Since the track 1 and the track 2 are fixed to a monaural type, information about their types does not need to be stored in the RAM 30. However, information about types of all the tracks 1 through 4 can also be collectively stored in the RAM 30 as a table. Suppose a monaural identifier is taken as M and a stereo identifier is taken as S, the followings are obtained when both the track 3 and the track 4 are set to a stereo type.

Track 1: M
Track 2: M
Track 3: S
Track 4: S

The CPU 32 displays a home screen on the display section 24 and indicates level meters on the home screen. When indicating level meters of the respective tracks, the CPU 32 makes a reference to track types of the respective tracks 1 through 4 stored in the RAM 30 and displays level meters in display styles conforming to the respective track types.

Figure 6:
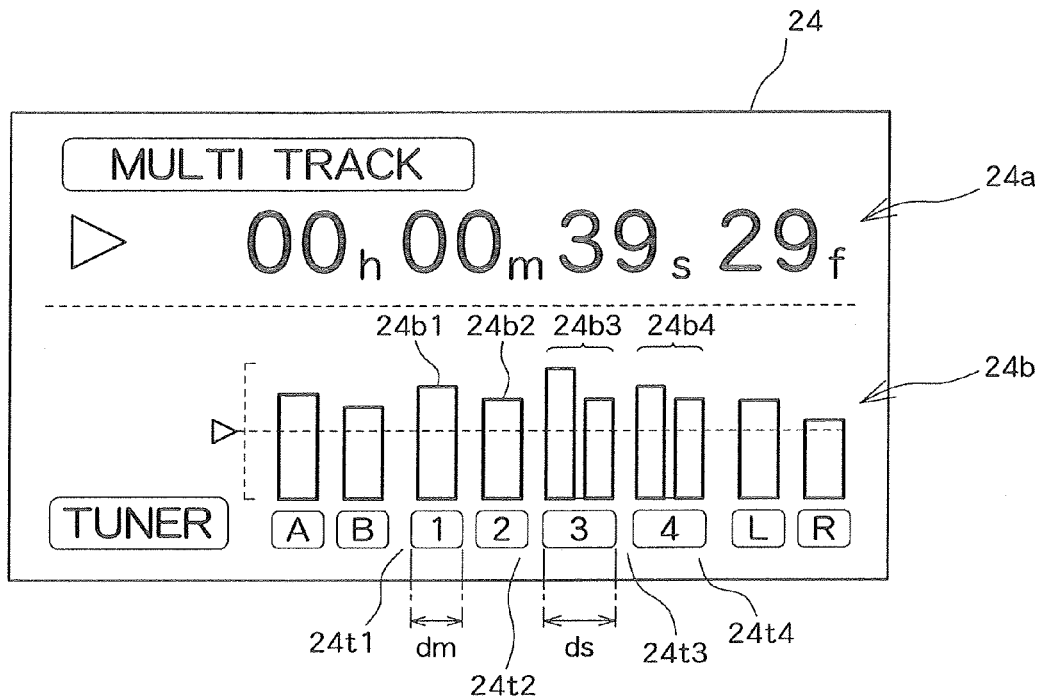
FIG. 6 is a descriptive view showing a display screen of a level meter.

FIG. 6 shows example level meters that the CPU 32 displays on the display section 24 according to track types by making an access to the RAM 30. The level meters are achieved when the track 1 and the track 2 are set to a monaural type and when the track 3 and the track 4 are set to a stereo type.

The display section 24 displays a time counter 24a and level meters 24b including input channels, the respective tracks 1 through 4, and stereo outputs as well as a transport status of the recorder (i.e., a PLAY/STOP/RECORD status, and the PLAY status is shown in the drawing).

The level meters 24b indicate sound signal levels of the respective tracks 1 through 4 in the form of bar charts. In the embodiment, when displaying the level meters of the tracks 1 through 4, the CPU 32 changes display styles according to track types. Specifically, symbols used for identifying the respective tracks 1 through 4; for instance, display sizes of track numbers, are first changed according to track types of the respective tracks. Second, the number of sound signal levels of the respective tracks 1 through 4 is changed according to track types of the respective tracks.

In relation to a display size of the track number, suppose a number display 24t1 of the track 1 and a number display 24t2 of the track 2, both of which are monaural tracks, have a width dm and a number display 24t3 of the track 3 and a number display 24t4 of the track 4, both of which are stereo tracks, have a width ds, the track numbers are displayed in such a way that a relationship dm<ds stands, or equivalently, the width of the number displays of the stereo tracks becomes relatively larger than the width of the number displays of the monaural tracks. In the meantime, it is preferable that the width ds of the number displays of the stereo tracks be set so as to fall within a range of dm<ds≤2 dm; in other words, to become relatively larger than and twice or less the width of the number displays of the monaural tracks, because a better visual balance will be accomplished.

In relation to a sound signal level, a level display 24b1 of the track 1 and a level display 24b2 of the track 2, both of which are monaural tracks, are each a single bar chart. On the contrary, a level display 24b3 of the track 3 and a level display 24b4 of the track 4, both of which are stereo tracks, are each made up of two bar charts. Since the number of the bar charts belonging to each of the tracks 3 and 4 is two, the bar chart of each of the tracks 3 and 4 naturally becomes relatively smaller in width than the bar chart of each of the tracks 1 and 2.

As mentioned above, the monaural track and the stereo track differ from each other in terms of the width of the track number display and the number of bar charts showing a level. For this reason, the user can readily identify whether each of the tracks 1 through 4 is of monaural or stereo type by viewing such level meters. The user first visually ascertains the number displays 24t1 to 24t4 of the respective tracks to thereby check their widths, so that the user can identify as a monaural track a track having a relatively smaller width is a monaural track and as a stereo track a track having a relatively larger width. Further, the user visually identifies a bar chart that shows a level of each of the tracks 1 through 4 and counts the number of the bar charts. When one bar chart is provided per track, the track can be identified as a monaural track. When two bar charts are provided per track, the track can be identified as a stereo track. When a bar chart is not displayed, a corresponding track type can be identified by means of only the width of its number display. When a bar chart is displayed, a corresponding track can be identified by use of only the bar chart or by use of both its number display and bar chart. Accordingly, even when the user forgot track types of the respective tracks 1 through 4, the user does not need to separately display a dedicated screen and can readily identify the track 1 and the track 2 as monaural tracks and the track 3 and the track 4 as stereo tracks by means of simply viewing the level meters shown in FIG. 6.

Two bar charts are assigned in the display to each of the tracks 3 and 4 that are stereo tracks. This means that the two bar charts respectively indicate levels of L-channel and R-channel sound signals of each of the tracks 3 and 4. In this sense, each of the track number displays 24*t*3 and 24*t*4 of the respective stereo tracks can be said as a single number display that collectively shows number displays of two channels, or an L channel and an R channel which make up a stereo sound. In other words, a symbol for specifying a channel is usually displayed for each channel. However, in the embodiment, a plurality of channels can be said to be collectively displayed as a single common symbol in connection with a stereo track.

Figure 7:
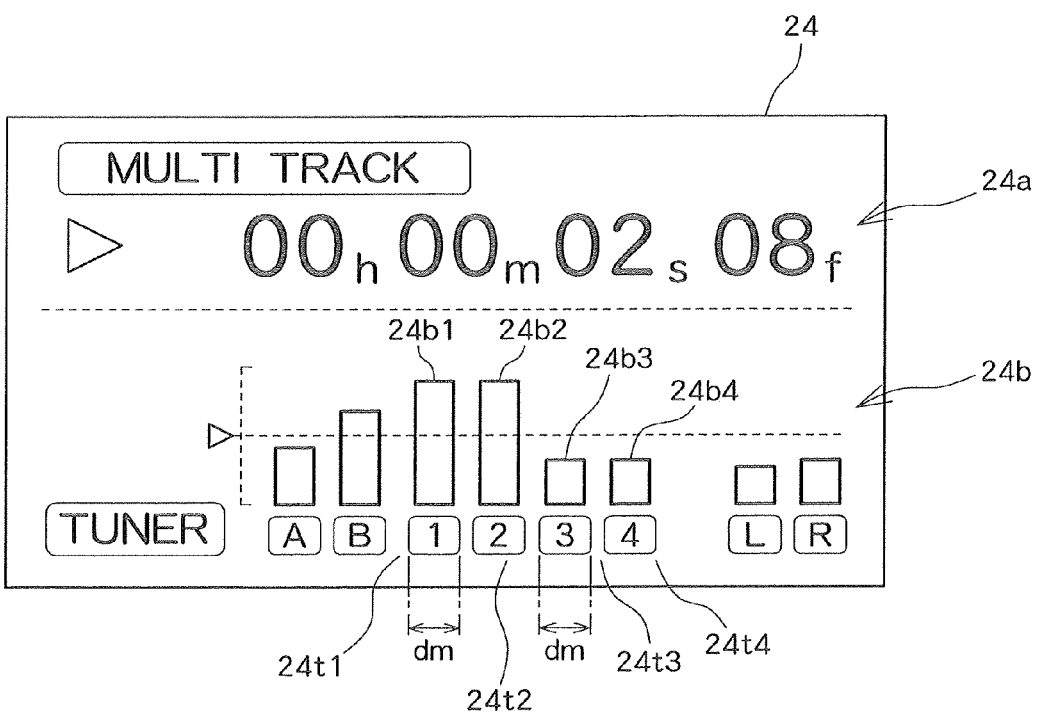
FIG. 7 is a descriptive view showing the display screen of the level meter.

FIG. 7 shows another exemplification of the level meter that the CPU 32 displays in the display section 24; namely, level meters displayed when both the tracks 3 and 4 as well as the tracks 1 and 2 are set to monaural tracks.

Since all of the tracks 1 through 4 are monaural tracks, all of the number displays 24*t*1 to 24*t*4 of the tracks 1 through 4 have an identical relatively-narrow width. Moreover, only one bar chart is assigned to all of the level displays 24*b*1 to 24*b*4 of the respective tracks 1 through 4. Accordingly, even if the user forgot track types of the tracks 1 through 4, the user can readily identify all of the tracks 1 through 4 as monaural tracks by visually ascertaining the level meters shown in FIG. 7.

Through a comparison between FIG. 6 and FIG. 7, it becomes clear how the display style of the level meter changes between the monaural track type and the stereo track type. Another conceivable display style is to display a letter M for each track when the track is a monaural track and a letter S for each track when the track is a stereo track. However, if a display area of the display section 24 is limited, difficulty would be encountered in visual identification. Accordingly, changing the size of the symbol and the number of bar charts are therefore preferable as described in connection with the embodiment. However, the invention shall not exclude a mode in which the letter M and the letter S are displayed for respective tracks when the display area of the display section 24 has a room.

It is easily comprehended that, when the track 3 is set to a stereo track and the track 4 is set to a monaural track in the exemplification of the screen shown in FIG. 6, though they are not illustrated, the width of the number display 24*t*4 of the track 4 becomes identical with the width dm of the number display 24*t*1 of the track 1 and the level display 24*b*4 also becomes a single bar chart.

As above, in the embodiment, the width of the track number display of the stereo track is made different from the width of the track number display of the monaural track. Further, the number of bar charts of the level display also varies between the stereo track and the monaural track. Accordingly, the user can reliably recognize the track type of each of the tracks 1 through 4 by means of only visually identifying a level meter without taking the trouble of switching the screen to a dedicated screen to check a track type.

The multitrack recorder having the track 1 through the track 4 is exemplified in the embodiment. However, the embodiment is not limited to this multitrack recorder. The invention can also be applied to a multitrack recorder having five or more tracks.

In the embodiment, the track types of the tracks 3 and 4 or the track types of all of the tracks 1 through 4 are stored in the RAM 30. However, the multitrack recorder can also be configured so as to store the track types in nonvolatile memory, such as the flash ROM 28, and continually retain the track type information even after being powered off.

In the embodiment, the width of the track number display of the stereo track is made different from the width of the track number display of the monaural track, and the number of bar charts of the level display is varied between the stereo track and the monaural track. The stereo track and the monaural track can also be made different in color in place of, or in addition to, the width and the number of bar charts. For instance, a monaural track is displayed in white, and stereo track is displayed in both blue and red. Specifically, in FIG. 6, all of the track number displays 24*t*1 to 24*t*4 are given the same width. The number displays 24*t*1 and 24*t*2 are displayed in white, whilst the number displays 24*t*3 and 24*t*4 are displayed in blue. Alternatively, all of the number displays 24*t*1 to 24*t*4 are displayed in white, and only the sound signal level of the stereo track is displayed in blue. As a matter of course, the number display and the sound signal level of the monaural track can also be displayed in white, and the number display and the sound signal level of the stereo track can also be displayed in blue.

What is claimed is:

1. A multitrack recorder that records a sound signal into a plurality of tracks, comprising:
    a setting section capable of setting at least any of the plurality of tracks to either a monaural track type or a stereo track type;
    a storage configured to store the track types set by the setting section;
    a display configured to display symbols for specifying the plurality of respective tracks and sound signal levels of the respective tracks; and
    a controller configured to cause the display to display the symbols and the sound signal levels with different display styles according to the track type stored in the storage and to change, in response to a change of setting of at least one of the track types stored by the storage, a display style of each of the symbols and the sound signal levels displayed in the display between the monaural track and the stereo track according to the changed setting of the track type.

2. The multitrack recorder according to claim 1, wherein the controller displays two bars of sound signal level for the stereo-type track and a symbol common to the two bars of sound signal level as the symbol, and displays one bar of sound signal level for the monaural track type and a second symbol corresponding to the one sound signal level as the symbol.

3. The multitrack recorder according to claim 1, wherein the controller sets a width of the second symbol to dm, and sets a width of the first symbol to ds, where dm<ds.

4. The multitrack recorder according to claim 1, wherein the controller changes a display color of, at least, the symbol or the sound signal level between the stereo-type track and the monaural-type track.

5. The multitrack recorder according to claim 2, wherein the controller displays the two sound signal levels corresponding to the first symbol with a smaller width than that of the one sound signal level corresponding to the second symbol.

6. A multitrack recorder that records a sound signal into a plurality of tracks, comprising: a setting section capable of setting at least any of the plurality of tracks to either a monaural track type or a stereo track type; a storage configured to store the track types set by the setting section; a display configured to display symbols for specifying the plurality of respective tracks and sound signal levels of the respective tracks; and a controller configured to change a display style of each of the symbols and the sound signal levels displayed in the display between the monaural track and the stereo track according to each of the track types stored in the storage.

* * * * *